Patented Apr. 16, 1929.

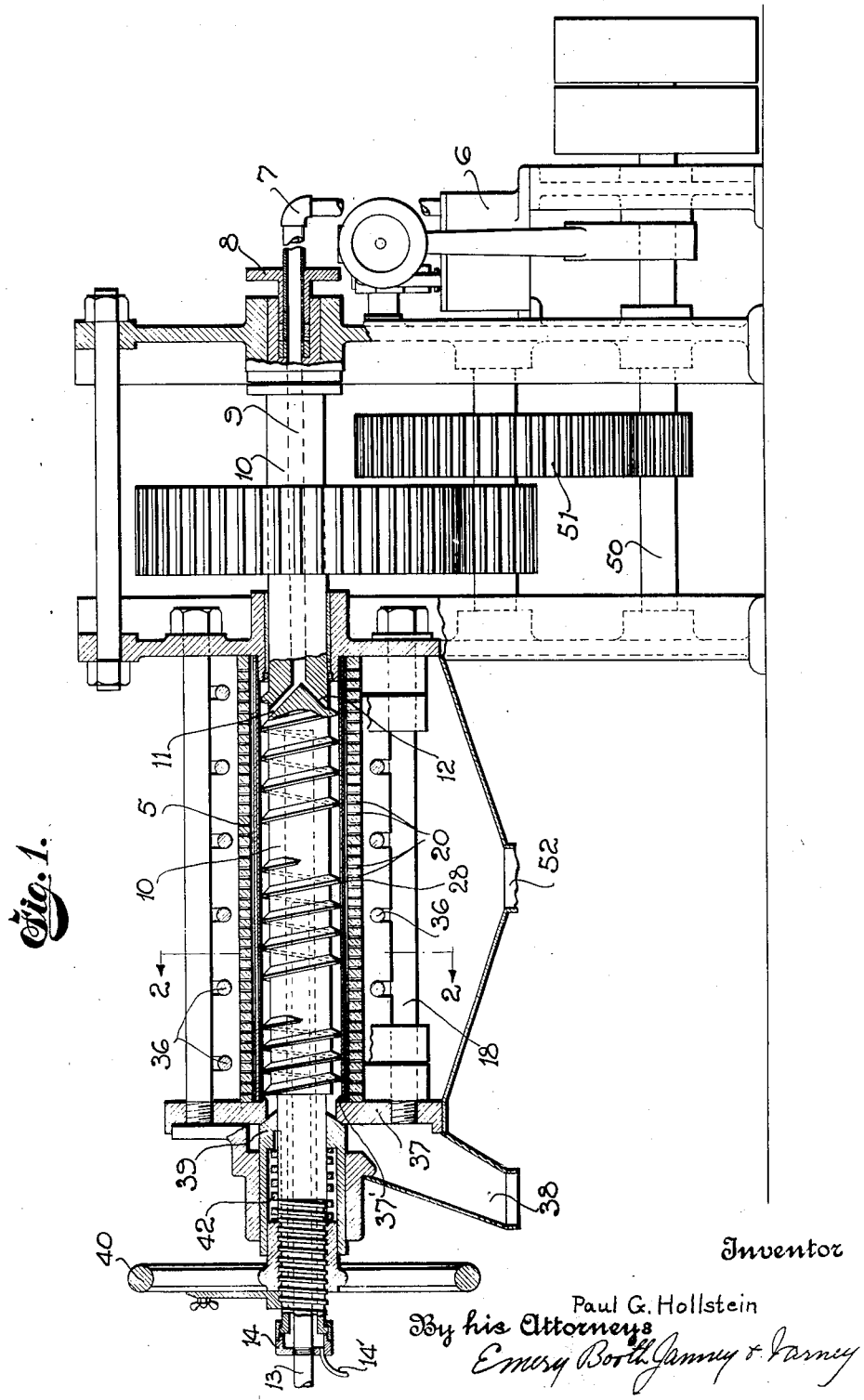

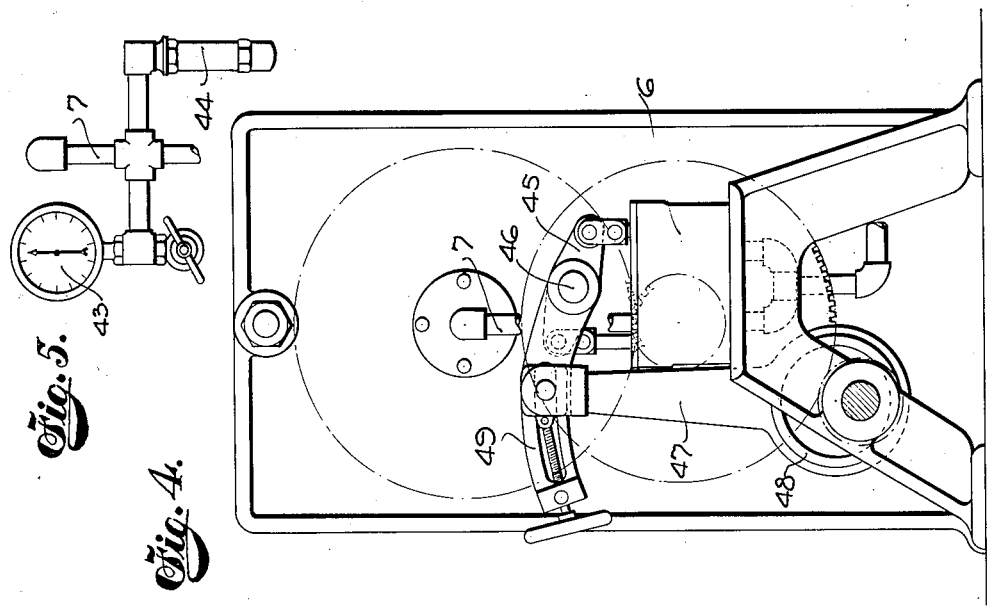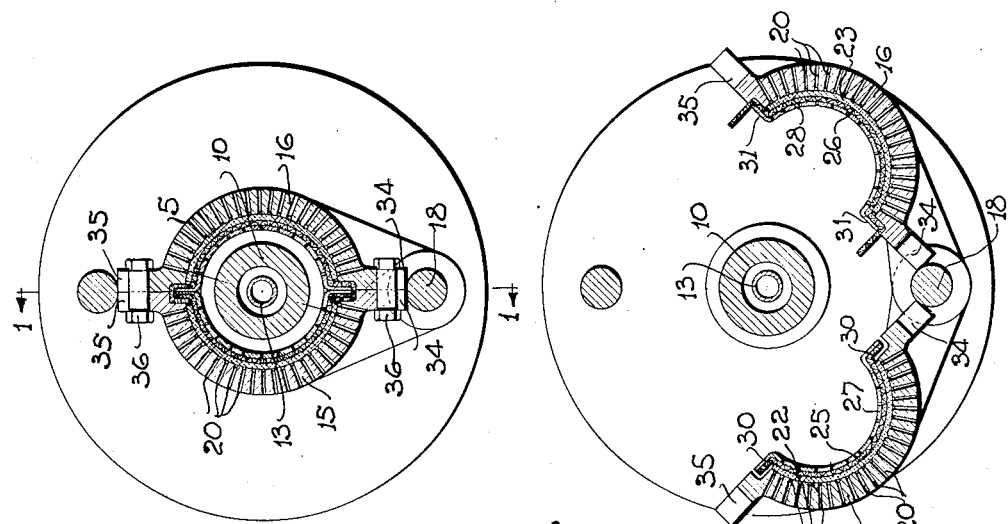

1,709,349

UNITED STATES PATENT OFFICE.

PAUL G. HOLLSTEIN, OF CARLSTADT, NEW JERSEY, ASSIGNOR TO J. M. LEHMANN COMPANY, INC., OF NEW YORK, N. Y., A CORPORATION OF NEW YORK.

FILTER PRESS.

Application filed March 24, 1924. Serial No. 701,358.

The present invention relates to mechanical filter presses and has for an object to provide an improved method of an apparatus for filtering liquid and semi-liquid material from solid matter.

The invention has been developed in connection with the filtering of cocoa bean liquor to separate cocoa butter from the solid cocoa and provides a continuous process in which the cocoa residue is discharged from the filter as a dry powder of a consistency similar to that of brown sugar. An apparatus particularly adapted for this work has been selected for particular description for the purposes of illustration but it will be understood the invention is not limited to the process and apparatus particularly described.

The nature and objects of the invention will be better understood as the description proceeds. For the purposes of such description reference should be had to the accompanying drawing forming a part hereof wherein:

Figure 1 is a central sectional view of a filter press constructed in accordance with and embodying the principles of the invention.

Figure 2 is a cross sectional view taken on the line 2—2 of Figure 1.

Figure 3 is a similar cross sectional view showing the two-part sectional filter in open relation.

Figure 4 is an end view taken from the right of Figure 1 looking toward the left but with the driving pulleys removed.

Figure 5 is a view showing the arrangement of the pressure gauge and safety valve.

The apparatus shown is designed more particularly for filtering ground and heated cocoa bean stock which is in suitable condition for the extraction of the cocoa butter from the solid residue. In the apparatus shown, the cocoa liquor in a heated condition is fed under pressure for example, under a pressure of fifty atmospheres, into the filter cylinder 5 by means of a force pump 6. The discharge pipe 7 of the force pump is connected through a suitable stuffing box 8 with a passage 9 extending longitudinally through the feed screw shaft 10 of the press. The passage 9 has two branches 11 and 12 at its inner end for discharging the material into the space between the feed screw and the filter cylinder wall.

The feed screw 10 is provided with means for advancing and pressing the cocoa stock, herein shown as a plurality of separate threads, each extending a few turns around the shaft. Preferably, and as shown, these separate threads are of different pitches, the one nearest the inlet being of the greatest pitch and therefore being arranged to carry forward a greater volume of material than the other screws. By this arrangement as the liquid or semi-liquid flows out through the wall of the filter cylinder the reduced volume of the remainder is still maintained under a gradually increasing pressure as it is fed along the cylinder.

The different threaded sections are so positioned and arranged that the forward end of each thread as it turns will cut into the annular mass of material being forced forward, at a point other than that at which the last preceding thread has cut through and thus will in a measure tend to effect a stirring of the mass.

The press may be heated or cooled to maintain the desired temperature of the material during the filter operation. In the press shown a heat exchange medium is introduced into the feed screw 10 which is made hollow for this purpose. As shown a pipe 13 enters the hollow screw through a non-rotatable connection 14 which is provided with an outlet 14'. A suitable stuffing box between the connection and the screw prevents leakage while permitting rotation of the screw.

The filter cylinder may for convenience be formed in two parts 15, 16 which are hinged together and may be open for cleaning and for applying fresh filter screens. As shown, the two sections are hinged upon the rod 18 and may be spread apart as indicated in Figure 3.

In the construction shown, the hinged members 15, 16 each constitute a shell section having radial holes 20 which may be for example an eighth of an inch in diameter and having along their inner faces larger semi-circular grooves 21 extending longitudinally of the shell. Against the inner face of this shell are provided sections of multiple screen, 22, 23 which may for example be sixty mesh screen of suitable material such as wire. In the particular illustration shown a sufficient number of plies of screen are combined to form sections one quarter of an inch in thickness when fully compressed. Within the metal screen are placed canvas filter cloths 25, 26 and inside of the filter cloth and serving to hold it in place and to protect it against wear due to the screw operating thereagainst, is a two part steel shell or lining 27, 28. This lining is provided with perforations which may be for example one sixteenth of an inch in diameter.

The lining 27, 28 is preferably provided with radially extending flanges 30, 31 and the filter cloths respectively are so arranged that the edges of one will extend outwardly parallel to and against the flanges of the one semi-cylindrical shell and the edges of the companion cloth will similarly extend outwardly against the flanges of the other shell and then over and around the two flanges as shown in Figure 2. By this arrangement the screw operates against a steel lining which may be suitably constructed to resist such wear but no liquid or semi-liquid matter can escape through the walls of the members without passing through the cloth as well as the other screening material which supports the cloth.

In view of the high pressure which is exerted upon the fluid within the press, the two sections 15, 16 of the two-part shell are preferably formed with bolt receiving flanges 34, 35 and a series of clamp bolts 36 are provided to secure both flanges tightly together.

At the discharge end of the press the material escapes between the screw and the end plate 37 and is discharged through the outlet 38. This outlet is controlled by a valve sleeve 39 splined to the end of the screw shaft 10. A hand wheel 40 which is threaded on to the end of the shaft 10 is provided to control the sleeve valve so that the same may be forced inwardly to its extreme position to close the outlet passage when the press is started in operation. The sleeve is further urged to its forward closed position by means of a spring 42 between the hand wheel and a shoulder on the sleeve. By this arrangement when the hand wheel is somewhat retracted to permit discharge of the material the valve will be automatically urged forward by the spring in the event the pressure of the discharging material is reduced below a predetermined amount. The end plate 37 is provided with a tapering flange 37' extending into the filter cylinder and fitting snugly in the lining 27, 28. The taper facilitates discharge of the solid matter.

The force pump 6 is made adjustable in order that the amount of material discharged thereby may be varied in accordance with the conditions of operation. As shown, in Figure 5, a pressure gauge 43 and a relief valve 44 are provided in connection with the discharge pipe 7 in order that the pressure of the material fed by the pump may be known and in order that excessive pressure may be relieved without damage to the apparatus.

The adjustment of the pump is accomplished by means of an adjustable connection between the operating eccentric and the piston rod. As shown, the piston rods are operated by a two arm lever 45 secured to a rock shaft 46 and a connecting rod 47 operated by the eccentric 48 is adjustably connected at its upper end to an arm 49 secured to the rock shaft 46 as best shown in Figure 4.

The feed screw 10 is actuated from the drive shaft 50 of the pump by suitable reduction gearing 51 as indicated in Figure 1.

In operation the cocoa liquor to be filtered is pumped into the press under a pressure of for example fifty atmospheres by means of the force pump 6 through the passage 9 in the shaft 10 and is fed forward along the interior of the filter cylinder with a gradually increasing pressure by means of the several threaded sections of the feed screw 10. These feed screw sections are relatively short and cause the material to be slightly mixed by successive screw sections.

The cross section of the threads is such as to present to the material being fed a feeding face lying at substantially 90° to the shaft, and to present on their back sides a sloping face. The shape of the threads and the shortness of each threaded section combine to prevent sticking of the material to the screw.

The temperature of the liquor is preferably kept below 160° F. and may conveniently be kept between 140° F. and 150° F. When starting the press in operation the feed screw is heated by introducing steam through the pipe 13 and during operation either steam or cold water is introduced as required to maintain the desired temperature.

The separated cocoa butter flows downwardly through the funnel shaped casing to an outlet 52 while the solid residue passes out through the discharge chute in the form of a loose dry powder which is in suitable condition for further treatment.

An indicator pointer is preferably provided on the hand wheel which facilitates adjusting the valve to such predetermined point as experience may suggest.

The foregoing description is illustrative merely and is not to be construed as defining the limits of the invention.

Claims:

1. A feed screw for a filter press arranged to operate within a cylinder of the press having a passage at one end arranged to discharge into the cylinder of the press and having at the opposite end a heating chamber with means for admitting the heating fluid to said chamber.

2. A feed screw for a filter press arranged to operate within a cylinder of the press, said screw being of substantially uniform diameter and having sections of progressively smaller pitch for forcing the material through the filter cylinder under progressively increasing pressure, said sections being spaced a distance substantially equal to one and one-half times the pitch of the adjacent threads whereby the material, after passing one section, will be compressed and compacted between sections and again immediately engaged by the next adjacent section.

3. A feed screw for a filter press arranged to operate within a cylinder of the press, said feed screw having sections of progressively smaller pitch for forcing the material through the filter cylinder under progressively increasing pressure, said sections being separated by unthreaded portions of a length equal substantially to one and one-half times the pitch of adjacent threads.

4. A feed screw for a filter press arranged to operate within a cylinder thereof, said screw having threaded sections of progressively smaller pitch for forcing material through the filter cylinder under progressively increasing pressure, said screw having a passage therethrough at one end arranged to discharge into said cylinder and having at the opposite end a heating chamber with means for admitting a heating or cooling fluid to said chamber to maintain the screw at a desired temperature, said passage and heating chamber being separated from each other longitudinally of the screw.

In testimony whereof, I have signed my name to this specification this 18th day of March, 1924.

PAUL G. HOLLSTEIN.